United States Patent [19]

Benstock et al.

[11] Patent Number: 5,003,902
[45] Date of Patent: Apr. 2, 1991

[54] SEAM HAVING LIQUID PROOF THREADS STICHABLY SECURING FIRST AND SECOND LIQUID PROOF MATERIALS FOLDABLY ENCLOSING A MELTABLE ADHESIVE POLYMER FILM AND METHOD OF MANUFACTURE OF SAME

[75] Inventors: Gerald M. Benstock, Belleair Beach; Nathan L. Belkin; Robert Green, both of Clearwater, Fla.

[73] Assignee: Superior Surgical Manufacturing Co. Inc., Seminole, Fla.

[21] Appl. No.: 420,908

[22] Filed: Oct. 13, 1989

[51] Int. Cl.⁵ .................. A41D 3/04; A41D 13/00; A41D 13/12; D05B 1/26
[52] U.S. Cl. .................. 112/418; 112/402; 112/440; 2/275; 2/DIG. 5; 2/DIG. 7; 2/2.1 R; 2/87
[58] Field of Search .............. 112/402, 418, 420, 440; 2/275, 274; 383/7, 12, 72, 86, 79, 91, 92, 108

[56] References Cited

U.S. PATENT DOCUMENTS

| | | | |
|---|---|---|---|
| 1,560,712 | 11/1925 | Naylor | 112/418 X |
| 1,935,612 | 11/1933 | Brady | 383/108 |
| 2,115,368 | 4/1938 | Lustberg | 2/275 X |
| 2,372,632 | 3/1945 | Webb | 383/108 X |
| 3,090,047 | 5/1963 | Grazia | 2/275 X |
| 4,372,998 | 2/1983 | Shimada | 2/274 X |
| 4,561,128 | 12/1985 | Zimmerman | 2/275 |
| 4,593,418 | 6/1986 | Simon | 2/275 |
| 4,604,152 | 8/1986 | Liukko | 2/275 X |
| 4,753,182 | 6/1988 | Blackburn | 112/419 |
| 4,757,559 | 7/1988 | Zanoi | 2/275 |

FOREIGN PATENT DOCUMENTS

| | | | |
|---|---|---|---|
| 0327291 | 9/1989 | European Pat. Off. | |
| 2458238 | 2/1981 | France | 2/275 |
| 4729138 | 1/1972 | Japan | 2/275 |
| 0979829 | 1/1965 | United Kingdom | 2/275 |

OTHER PUBLICATIONS

Federal Standard "Stitches, Seams and Stitchings" Commissioner of General Services Administration.

Primary Examiner—Werner H. Schroeder
Assistant Examiner—Ismael Izaguirre
Attorney, Agent, or Firm—Weingram & Zall

[57] ABSTRACT

A liquid proof seam construction is provided. A double needle flat-felled seam is constructed having a melt adhesive polymer film disposed within the seam. The seam is then passed through a hot air/pressure device which melts the film and compresses the seam. This forms a liquid, e.g. waterproof, bond between adjacent layers of material and also fills up any area around the stitching formed by needle holes.

18 Claims, 2 Drawing Sheets

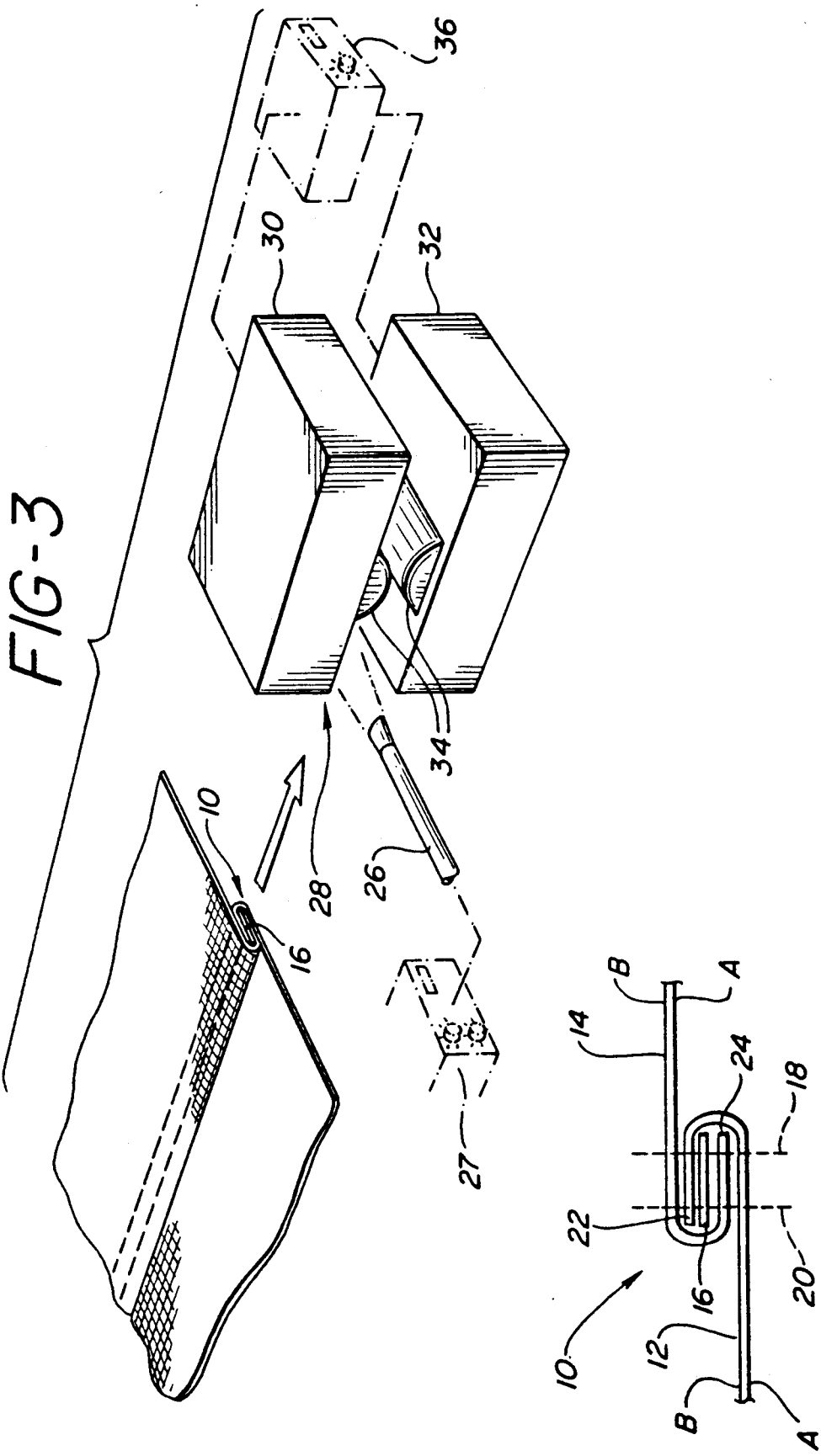

SEAM HAVING LIQUID PROOF THREADS STICHABLY SECURING FIRST AND SECOND LIQUID PROOF MATERIALS FOLDABLY ENCLOSING A MELTABLE ADHESIVE POLYMER FILM AND METHOD OF MANUFACTURE OF SAME

BACKGROUND OF THE INVENTION

1. Field of the Invention

This invention relates, generally, to fabric seams and more particularly, to a liquid proof (e.g. waterproof) seam and method of manufacture.

1. Prior Art

Many attempts have been made to make liquid proof, particularly waterproof, articles such as raincoats, jackets, and similar outerwear as well as tents, outdoor equipment, tarpaulins and the like. Accordingly, the technology has developed to the point where reusable woven or knit fabric materials offer varying degrees of liquid proofing depending upon the characteristics of the material utilized and the use to which the material will be put.

Of recent date, a new class of garments have become important. This class relates to surgical, medical, laboratory and other types of garments, worn by personnel that have interaction with patients; as well as laundry bags, containers and the like for such medical uses. More particularly, with the attention of the clinical community focusing on the transmission of infectious diseases by blood and body fluids, the use of personal protective clothing has increased significantly. Comfort of such clothing has also become an important consideration.

While some materials are totally impervious to fluids and the like, they are generally unsuitable in that they do not breathe and/or are difficult or generally uncomfortable to wear. Furthermore, since materials of this nature cannot be sterilized by traditional methods, their use is prohibited. As a result, a number of materials have been developed which offer excellent comfort and performance characteristics. Examples of these fabrics are FASHION-BLOC and FASHION-SHIELD manufactured and produced by Superior Surgical Mfg. Co., Inc. of Seminole, Fla. These materials are very effective when worn as protective apparel by a health care worker during a procedure.

Protective apparel is also used to reduce the risk or exposure of a worker's skin or mucous membranes to blood and body fluids containing visible blood and other fluids to which universal precautions for the transmission of HIV ("Universal Precautions") apply. Such precautions are relatively standard in the health care industry for a variety of reasons, the most recent and perhaps most important being the potential contraction of Acquired Immunity Deficiency Syndrome. i.e., AIDS.

However, while fabric construction has advanced greatly, the liquid proofing, e.g., waterproofing, of seams in these items has continued to present problems. Moreover, these types of items are generally only cost effective when repeated usage is possible. Therefore, they must be able to withstand the rigors of numerous institutional type processing cycles (laundering, drying and ironing), sterilizations and the like. Therefore, seam makeup including thread, overall construction and other fluid-resisting materials must similarly be able to withstand such abuse.

Many attempts have been made to produce waterproof, water resistant or liquid proof seams. For example, U.S. Pat. No. 4,604,152, "Method of Making a Stitched and Bonded Seam" to Liukko describes a liquid proof seam formed by interposing a thermal adhesive between overlapping edges of material. However, this has a significant drawback in that the joint is formed solely by the thermal adhesive. Once a portion of this type seam separates, for any one of a variety of reasons, a zippering effect will result, i.e. the entire seam will fail as stress is placed on it.

U.S. Pat. No. 4,593,418, "Method and Seam Construction to Significantly Reduce Seam Leakage" to Simon describes an elastomeric strip interposed between sheets of material. The elastomeric material is sewn to the seam, and surrounds and seals the thread as it passes through the seam. However, this is also somewhat unsatisfactory in that, since no bonding occurs between the elastomer and fabric, the integrity of the liquid proof seam is entirely dependent upon the structural integrity of the sewing. Therefore, should the thread become loosened or broken, fluids may wick or pass by or through the seam itself.

U.S. Pat. No. 4,561,128 "Fusing Apparel Seams" to Zimmerman is directed to a method for fusing seams for the purpose of providing aesthetically pleasing, i.e. straight and flat, seams. This patent does not teach or suggest waterproofing or the problems associated therewith.

U.S. Pat. No. 2,115,368 "Seam" to Lustberg describes a waterproof seam by interposing a water repellant material between two layers of waterproof material. A water repellant thread is utilized to sew the seam. The integrity of this seam is dependent upon the mechanical integrity produced by thread. Therefore, should the thread become loose or ripped, passage for fluids is made possible.

While all of the above offer solutions to the problem of enhancing the integrity of seams, they are all lacking in one respect or another.

OBJECTS AND SUMMARY OF INVENTION

It is an object of the present invention to produce a seam suitable for use in protective apparel which satisfies the "Universal Precautions" used in the clinical field.

It is yet another object of the present invention to produce a seam which is capable of enduring repeated rigorous institutional launderings, sterilizations and usage.

A further object of the present invention is to produce a seam which will not zipper, that is, tear in the seam and migrate along the entire length of the seam.

Still a further object of the present invention is to produce a seam which has strong mechanical properties which will resist failure during normal usage or wearing.

Another object of the present invention is to produce a seam which is simple and inexpensive to manufacture.

Yet another object of the present invention is to produce a seam which prevents wicking of fluids, particularly aqueous fluids, through the thread or apertures in the seam produced by the thread.

Still another object of the present invention is to produce a seam which bonds adjacent layers of fabric material together to thereby form a liquid-tight seam.

Yet another object of the present invention is to produce a seam whereby a thermo-adhesive material seals any apertures in the seam surrounding the thread sewn in the seam.

The foregoing objects are achieved by providing a liquid proof, e.g. waterproof, garment seam. The garment seam comprises a first liquid proof fabric material and a second liquid proof fabric material having portions thereof overlapping each other, the portions being bonded together by a melt adhesive film disposed therebetween, and a liquid proof thread extending through the overlapping portions and film for fixedly securing the overlapping portions and film to form a liquid proof seam.

The method for forming the liquid proof seal comprises:

(a) providing a melt adhesive polymer film between over-lapping portions of two sheets of liquid proof fabric material to form a seam area;

(b) stitching the seam area with a liquid proof thread through the overlapping portions and film;

(c) heating the seam area to melt-bond the film to the overlapping portions of fabric material to thereby form a liquid proof seam.

DESCRIPTION OF THE DRAWINGS

Reference may be had to the accompanying drawings in which:

FIG. 3 is a schematic representation of the method of this invention by which the seam is rendered liquid proof; and FIG. 4 is a schematic end view of the seam of the present invention.

DETAILED DESCRIPTION OF THE PREFERRED EMBODIMENT

Figure 1:
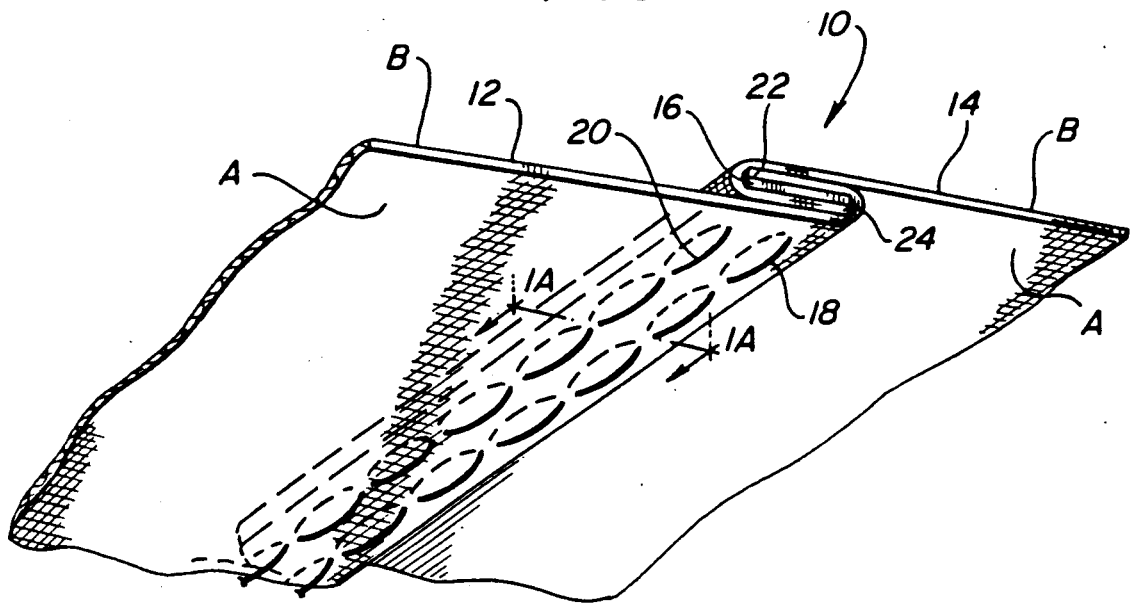
FIG. 1 is a perspective view of the seam of the present invention.
Figure 1A:
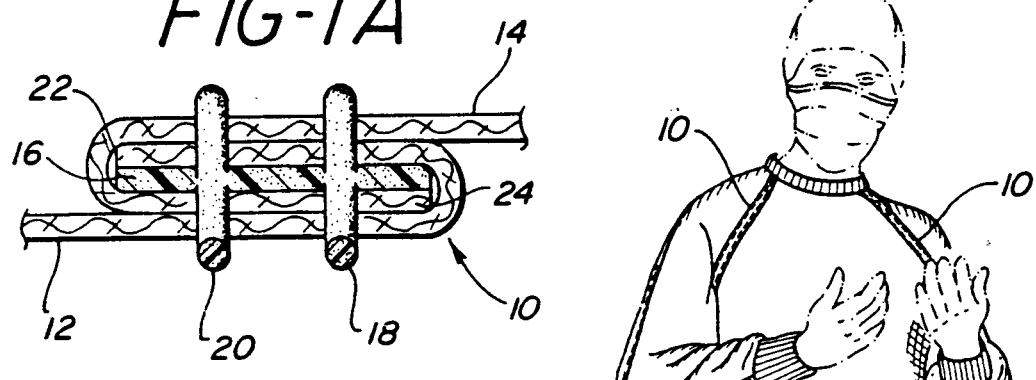
FIG. 1A is a cross-section of the seam of the present invention taken along line 1A—1A of FIG. 1.

Referring now to FIGS. 1, 1A and 4 there is shown a perspective and end views, respectively of the seam of the present invention. More particularly, the preferred seam construction is shown generally at 10 and is comprised of a first fabric material 12 in overlapping relationship with a second fabric material 14. A melt adhesive film 16 is disposed between first and second edges 22,24 respectively of the first and second materials 12,14. In the preferred embodiment of the present invention, film 16 is a polyester film of an appropriate thickness, as for example, approximately 3-7 mils thick having a melting point of from about 250° F. to about 270° F. Two rows of waterproof, preferably thermoplastic polymer thread 18,20 are stitched through the fabric materials and film, the entire seam being a double needle flat-felled seam. Preferably the threads are a polyester treated with a fluorocarbon finish. Preferably the thermoplastic threads have a higher melting point, than the film to maintain the integrity of the seam after heating, (e.g. 450° F. melting point). Thus, upon heating of the seam to a sufficiently high temperature to melt the film, the thread is at most only partially melted or softened. The coating of fluorocarbon on the thread prevents wicking of aqueous fluids through the seams by virtue of the thread acting as a conduit or wick.

In the preferred embodiment of the present invention the first and second fabric materials 12,14 are preferably a yarn such as a polyester texturized yarn or a continuous filament polyester yarn such as FASHION BLOC or FASHION SHIELD, products of Superior Surgical Mfg. Co. of Seminole, Fla. However, it is to be understood that any suitable fabric material having a relatively dense weave and/or hydrophobic properties which prevent penetration of the liquid, and can withstand the heat and pressure to which the seam is subjected, may be utilized without departing from the spirit and scope of the present invention.

The terms "melt-adhesive film" and "thermoplastic polymer" as used in describing the film 16 and thread 18,20 respectively means the ability of the film or thread to deform or melt when an appropriate temperature and/or pressure is applied to enable conformation and/or adherence of the film or thread to the surface it is in contact with. Such terms are not to be considered to limit the chemical structure of the film or thread but only its physical properties under the conditions of use described herein.

Referring to FIGS. 1A and 4, seam 10 is preferably constructed so that the ends of fabric materials 12,14 are folded in overlapping U-shaped fashion so that first and second edges 22,24 meet the inside of the U-shaped seam for the second and first materials 14,12 respectively, with the film 16, therebetween. In this manner, the "A" and "B" sides of material 12 are in contact with the "A" and "B" side of material 14 and the "B" side of material 14 is in contact with film 16 while the "B" side of material 12 is in contact with the opposing surface of film 16.

Referring to FIG. 3, in the preferred embodiment of the present invention the seam 10 is passed through a hot air blower 26 and pressure rollers 34 after the seam 10 is constructed and sewn. This process consists of a controlled balance of air temperature, roller pressure and speed of the rollers applied to the seam area 10 so as to minimize distortion, puckering and damage to the base fabric and accomplish the final seaming operation. This operation melts and bonds the film 16 to the "B" sides of materials 12,14 along the seam length and additionally fills up the needle holes surrounding threads 18,20. Additionally, there may be a partial melting or softening of threads 18 and 20 to assist in closure of these holes and melt with the film 16. Accordingly, the seam produced has excellent mechanical strength and is waterproof. An important aspect of this invention is that the film, when melted, fills the needle holes thereby preventing any wicking or migration of fluids therethrough, without destruction of the integrity of the thread. Preferably the polyester film and fiber, after heating, create an integral waterproof structure.

Once the seam 10 is physically constructed, that is, the first and second materials have been overlapped and film 16 has been sewn into the seam area, it is passed through a press 28. It is to be understood that any suitable type of heat/pressure device may be utilized as long as it exhibits the appropriate heating characteristics commensurate with the particular film and thread being utilized (i.e. temperature, pressure and speed). The device 28 is comprised of upper and lower rollers 34. The function of rollers 34 are to advance and compress the seam as it passes between the rollers 34. In the preferred embodiment of the present invention the rollers exert an appropriate amount of pressure precisely at the point of temperature application thereby providing optimum heating and fusing characteristics. Preferably, the rollers apply a pressure of about 50 to 80 psi and are rotated at a speed sufficient to cause the material to be fed at about 20 to 40 feet per minute, preferably 30 feet per minute. The fabric is preferably heated by hot air jet 26, preferably at a volume of 80 ft$^3$/min. having a temperature of about 650° C. to 800° C. for about 2 to 3 seconds. Obviously, these parameters are highly dependent on the specific structure of the device, the structure of the seam and the type fabric, thread and film used.

Figure 2:
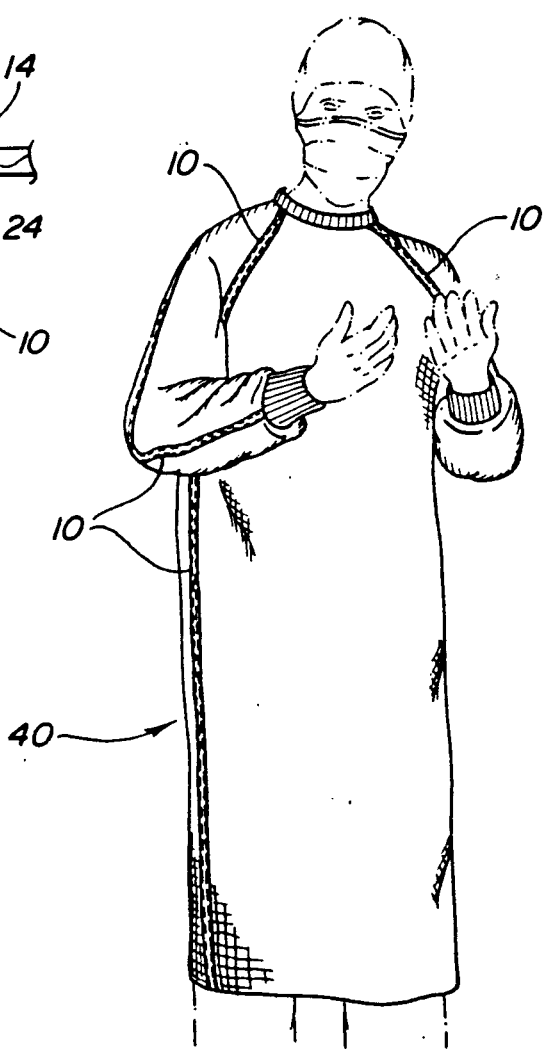
FIG. 2 is an illustration of a representative garment utilizing the seam of the present invention.

Referring to FIG. 2 there is shown a sketch of protective gown 40 utilizing the seam 10 of the present invention. Although it has been found that it is possible to produce garments having a minimal number of seams, some seams must be used for comfort, to maximize yield of material, facilitate manufacture and minimize costs. It is to be understood however that the present invention may be practiced with respect to any fabric structure, including garments, laundry bags and the like without departing from the spirit and scope of the present invention. The present invention produces a seam which is extraordinarily resistant to stress and which is also highly resistant to laundering processing cycles and the like. It has been found that a garment or bag or the like, although initially more expensive to manufacture, is actually cost effective when the overall life of the product is taken into account.

It is to be understood that many variations of the present invention may be practiced without departing from the spirit and scope of the present invention. For example, the number of folds in the material may be increased or decreased or a plurality of films may be interspaced throughout the seam. Further, other types of thread may be used or different fabric materials may be utilized and the seams may be used in any fabric structure.

I claim:

1. A liquid proof seam, comprising:
   a first liquid proof fabric material;
   a second liquid proof fabric material having at least a portion thereof in overlapping relationship with at least a portion of the first material;
   a melt adhesive polymer film means having upper and lower opposite facing surfaces disposed between the overlapping portions of the first material and the second material for bonding the overlapping portions together to form a seam area;
   first fold means in said first liquid proof fabric material to position portions of said first liquid proof fabric material on said upper and lower surfaces of said polymer film means;
   second fold means in said second liquid proof fabric material to position portions of said second liquid proof fabric material on said upper and lower surfaces of said polymer film means;
   said positioned portions of said first and second liquid proof fabric material coacting to completely enclose said polymer film means; and
   a liquid proof thread means extending through the first nd second materials and the overlapping portions and the film means for fixedly securing the the seam area;
   wherein the film means melt bonds the overlapping portions of the first material and the second material together and is disposed in apertures around the thread means.

2. The seam according to claim 1 wherein the seam is double needle flat-felled.

3. The seam according to claim 1, wherein the liquid proof seam is a waterproof garment seam.

4. The seam according to claim 1, wherein the seam is a laundry bag seam.

5. The seam according to claim 1, wherein the thread and film are of a thermoplastic polymer material.

6. The seam according to claim 5, wherein the film has a lower melting point than the thread.

7. A liquid proof seam, comprising:
   a melt adhesive polymer film having upper and lower opposite facing surfaces;
   a first liquid proof material having an edge, a fold, an area between the edge and the fold, and an area beyond the fold, the edge being positioned along the lower surface of said film;
   a second liquid proof material having an edge, a fold, an area between the edge and the fold, and an area beyond the fold, the edge being positioned along the upper surface of said film;
   the fold of said first material positioning the material beyond the fold of said first material over the edge of said second material;
   the fold of said second material positioning the material beyond the fold of said second material under the edge of said first material, so that said first and second liquid proof materials coact to provide a seam area that completely encloses said film;
   a liquid proof thread means extending through the seam area for fixedly securing the seam; and
   said melt adhesive film being sufficiently melted to bond the edges of said first and second material together and flow into any apertures surrounding said thread means.

8. The seam according to claim 7, wherein the seam is double needle flat-felled.

9. The seam according to claim 7, wherein the liquid proof seam is a water proof garment seam.

10. The seam according to claim 7, wherein the seam is a laundry bag seam.

11. The seam according to claim 7, wherein the thread and film are of a thermoplastic polymer material.

12. The seam according to claim 11, wherein the film has a lower melting point than the thread.

13. A method for forming a liquid proof seam, comprising the steps of:
   (a) folding a first liquid proof fabric material about opposite facing surfaces of a metal adhesive polymer film, said liquid proof fabric material contacting at least one of said surfaces;
   (b) folding a second liquid proof fabric material about opposite facing surfaces of said melt adhesive polymer film, said second liquid proof fabric material contacting at least one of said surfaces to form an enclosure for said melt adhesive polymer film;
   (c) stitching through at least tow layers each of said first and second liquid proof fabric materials and said melt adhesive polymer film; and
   (d) heating the seam area to melt bond the film to the overlapping portions of fabric material to thereby form a liquid proof seam.

14. The method according to claim 13, comprising of the additional step of compressing the seam area contemporaneously with the heating thereof.

15. The method according to claim 13, comprising of the additional step of double stitching the seam area.

16. The method according to claim 13, wherein during the heating step of the method, the film is melted sufficiently so as to allow the film into any stitching holes.

17. The method according to claim 13, wherein during the stitching step of the method, a double needle flat-felled seam is formed.

18. A method for forming a liquid proof garment seam, comprising the steps of:
(a) folding a first liquid proof fabric material about opposite facing surfaces of a melt adhesive polymer film, said liquid proof fabric material contacting at least one of said surfaces;
(b) folding a second liquid proof fabric material about opposite facing surfaces of said melt adhesive polymer film, said second liquid proof fabric material contacting at least one of said surfaces to form an enclosure for said melt adhesive polymer film;
(c) stitching the seam area with a liquid proof thread to form a double needle flat-felled seam; and
(d) contemporaneously heating and compressing the seam sufficiently so as to melt bond the film to the overlapping portions of the waterproof fabric material and to allow the film to flow into and around any stitching holes.

* * * * *